Patented June 5, 1928.

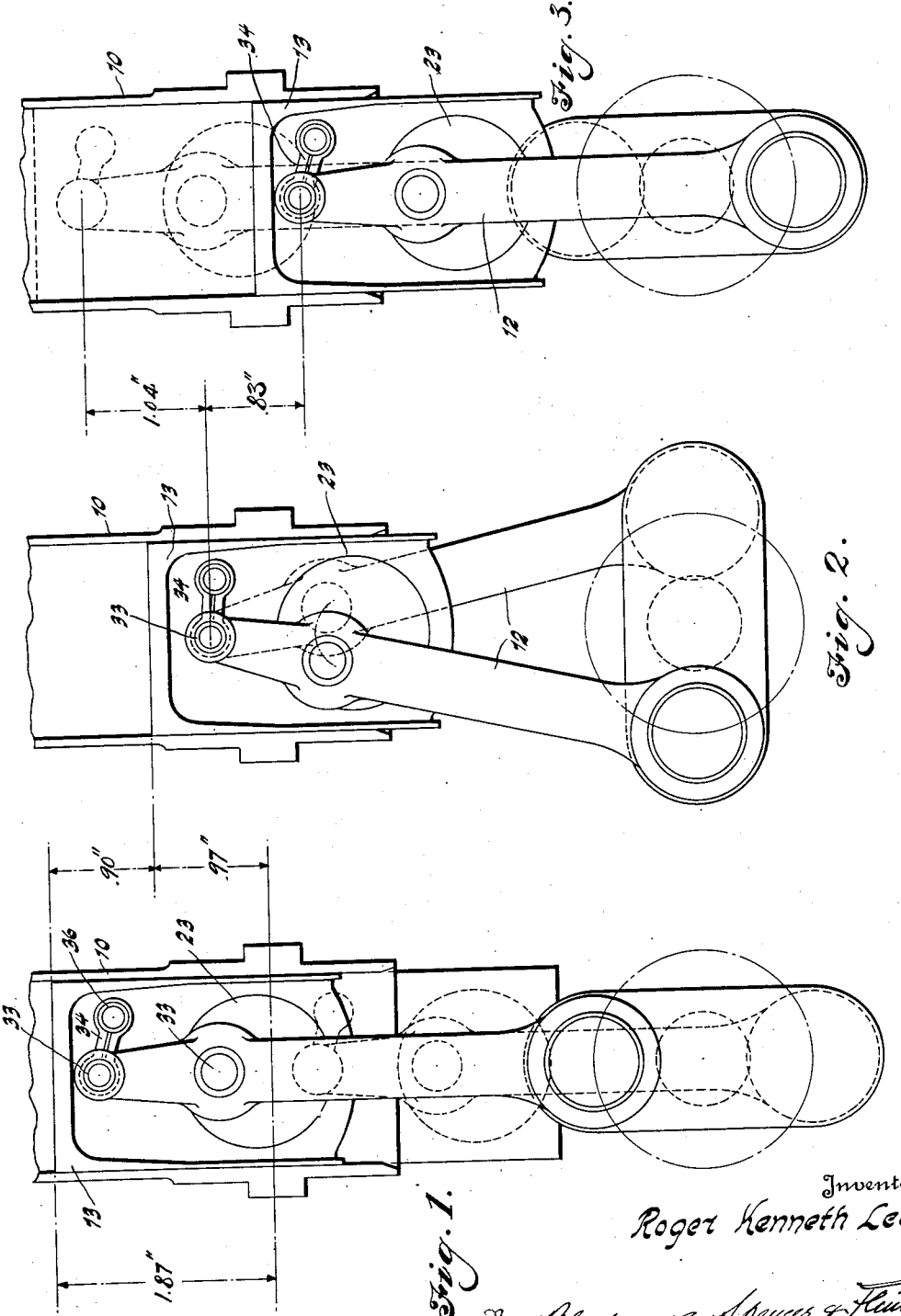

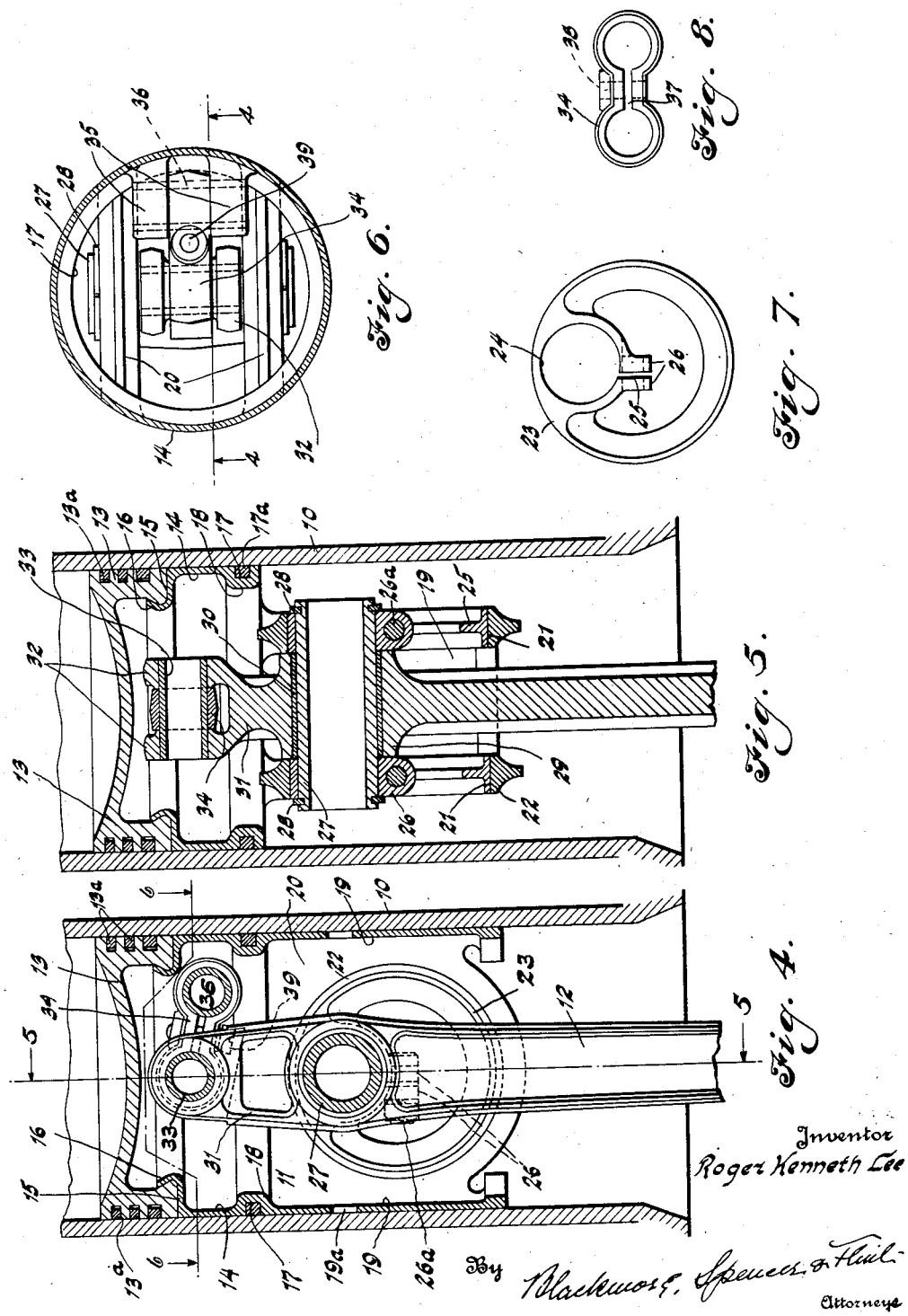

1,672,164

UNITED STATES PATENT OFFICE.

ROGER KENNETH LEE, OF DETROIT, MICHIGAN, ASSIGNOR TO GENERAL MOTORS RESEARCH CORPORATION, OF DETROIT, MICHIGAN, A CORPORATION OF DELAWARE.

MEANS FOR BALANCING RECIPROCATING MASSES.

Application filed June 11, 1926. Serial No. 115,294.

This invention relates to improvements in coupling reciprocating masses to crank operated pitmen or connecting rods; it is particularly applicable to reciprocating engines or pumps in which the connecting rods are pivoted to the crank pins of a crank shaft, the throws of which are on opposite sides of the axis in the same plane.

The object is to balance the inertia forces of the pistons or oppositely moving masses in machines of the type described.

The means disclosed in this application is an improvement on that forming the subject of U. S. Patent No. 1,566,486, dated Dec. 22nd, 1925.

In the accompanying drawings, in which like reference characters indicate like parts throughout the several views:

Figs. 1, 2 and 3 are diagrams illustrating different positions of the cranks, pistons and connecting rods arranged according to this invention;

Fig. 4 is a longitudinal sectional view taken on the line 4—4 of Fig. 6;

Fig. 5 is a longitudinal section at right angles to that of Fig. 4;

Fig. 6 is a transverse section on the line 6—6 of Fig. 4;

Fig. 7 is a detail view of one of the eccentrics in which a connecting rod wrist pin is mounted and Fig. 8 is a detail view of one of the guide links for the upper end of the connecting rod.

Referring first to Figures 4 to 8 inclusive, which exemplify the invention and illustrate the construction of one piston and connecting rod of a multi-cylinder engine, built in accordance with this invention:

Numeral 10 indicates a cylinder; 11 a piston slidable within said cylinder and 12 a connecting rod, by means of which the pressure of expanding gas above the piston transmits the resultant movement of the piston to a crank shaft.

The piston illustrated is of a composite type comprising an aluminum head 13 and an iron or steel skirt 14. The aluminum head has ring grooves in its circumference for the purpose of receiving packing rings 13ª, which prevent the escape of gas under pressure past the piston.

The skirt in the illustrated embodiment is of cast iron and has at its upper end an annular shelf like portion 15 from the inner edge of which rises an inverted conoidal flange 16, the head 13 having been cast-united with the skirt. The flange 16 is arranged at such an angle that the joint between the iron and aluminum remains tight throughout all differences of expansion and contraction occurring at the temperatures to which the piston is subjected in use.

As thus far described, the bi-metallic piston is of a type previously known.

In the form of skirt adapted to this invention a cylindrical body extends down to an oil ring groove 17, receiving a packing ring 17ª; the groove is machined in the skirt, an annular thickened portion 18 having been cast in the latter to provide adequate thickness for the purpose. Depending below the thickened portion 18 are two opposite segments 19, thus forming a piston of the type sometimes designated as the slipper type of piston. The segments 19 bear upon the cylinder at opposite sides of the wrist pin connection serving as guides, while the spaces between them are open, thus reducing the weight of the skirt. The segments may have holes 19ª still further lightening them and allowing oil to pass.

Each segment 19 is connected to the opposite segment by parallel transverse webs 20. These webs are bored so as to form axially aligned round openings 21 and the said webs are thickened, as at 22, around the openings 21.

The openings 21 serve as bearings for eccentrics 23 which are fitted to oscillate in said openings. Eccentrics 23 are open in the middle or somewhat ring-like in form for the purpose of making them light. Material is provided at one side of the center of each eccentric for wrist pin openings 24. A slit 25 separating two lugs 26 enables the bearing opening 24 to be adjusted to the wrist pin, said lugs 26 being perforated and having a bolt 26ª seated in the perforations for the purpose.

The wrist pin shown at 27 is tubular to give it lightness and strength and it may be prevented from endwise movement by split locking rings 28 fitted in grooves in the ends of the wrist pin, and bearing against the external faces of the eccentrics.

Connecting rod 12 is provided with bosses 29 that fit between the inner faces of the eccentrics; said connecting rod is drilled through the bosses for the purpose of receiving the wrist pin. A suitable bushing 30 surrounds the wrist pin where the latter penetrates the connecting rod.

Connecting rod 12 has a portion 31 that extends beyond the wrist pin toward the piston head as shown, and terminates in a fork, the limbs 32 of which are perforated to receive preferably hollow pin 33. Disposed between the limbs 32 is one end of a link 34, penetrated by said pin 33. The other end of link 34 is pivoted to the piston at one side of its central plane that is parallel with the axes of the crank shaft and wrist pin. The relation between the connecting rod and the link is such that the movements of the end of the link pivoted to the connecting rod are approximately parallel with the axis of the piston, the link projecting in all positions at an angle to the longitudinal axis of the piston, approximating a right angle.

To form a bearing for the link on the piston, two lugs 35 may be cast or otherwise formed on one side of the piston, the inner end of the link 34 seated between them and pivoted by means of a hollow pin 36 passed through aligned openings in the lugs and an opening in the link.

The link 34 is composed, as shown, of a bar having a bearing opening in each end, said openings being connected by a slot 37, which permits of slightly varying the size of the bearing openings. The central portion of the link 34 is intended to be perforated as at 38 in order to receive a bolt 39 by means of which the size of the holes in the link may be slightly varied in order to make them nicely fit the hollow pivot pins.

It will be apprehended that as the crank pin or eccentric to which the lower end of connecting rod 12 is pivoted rotates, the connecting rod will be swung from side to side about the pivot pin 33 and that this pivot pin will move up and down relatively to the piston by reason of the oscillatory movements of eccentrics 23 so that there will be also a differential movement between the connecting rod and the piston in the direction of the longitudinal axis of the latter.

The movements are to be so differentiated with respect to the masses of the piston and outer portion of the connecting rod that the inertia effects will be substantially equal in each half length of piston travel.

Figs. 1, 2 and 3, illustrate diagrammatically a multi-throw crank shaft with opposed cranks 180 degrees apart and the respective positions assumed by the opposed pistons and connecting rods at top dead center, at bottom dead center and at two intermediate positions.

It is well understood that certain vibrations of ordinary four cylinder and other engines in which opposed cranks are spaced 180 degrees apart, is due to the fact that each piston moves further during the first and fourth quarters of a revolution (in considering the starting point as top dead center) than it does during the second and third quarters, the differential being less as the length of the connecting rod is increased. The conception underlying this invention involves the adjustment of the travel of the pistons and rods so that the inertia forces of the oppositely moving masses of connecting rods and pistons shall balance at every crank position. The outer ends of connecting rods as well as the pistons of directly pivoted pistons and connecting rods have different degrees of longitudinal movement during one rotation of the crank and it has been necessary to take both into consideration in calculating the relative movements necessary in order that the various oppositely acting inertia forces may cancel each other. In Fig. 1 there has been shown a piston which has, of course, a total travel equal to the diameter of the circle described by the axis of the crank pin which in the dimensions of the drawings is 1.87". In calculating the relative movements necessary in the particular example the connections have been made such that the piston will travel .90" in one direction in the first and .90" in the opposite direction in the fourth quarter of its stroke as indicated in Figs. 1 and 2, while in the second and third quarters the travel of the piston will be .97" first in one direction and then in the opposite while the opposed piston reverses the order of travel.

In Fig. 3 there is indicated the amount of vertical travel of the upper end of the connecting rod in this particular embodiment, which is, of course, 1.87", the same as the total travel of the piston. During the first and fourth quarters the amount of travel is 1.04" and during the second and third quarters, .83". The opposed connecting rods of course travel the same distances in reverse order.

It has been found that the differential movements indicated in the particular embodiment shown produce substantially a balance of the oppositely moving masses connected to the opposed cranks at each position of the crank shaft throws, as described in said prior patent.

By guiding the upper end of the connecting rod by a link as shown both friction and weight are reduced to a minimum.

The composite piston shown with slipper skirt, connecting webs and ring-like eccentrics enables the piston to be lightened while affording superior strength.

While the disclosed embodiment is preferred, it will be understood that the invention might be embodied in other specific forms without departing from the spirit of the invention.

What I claim is:

1. The combination with a crank shaft having an even number of throws disposed upon opposite sides of the shaft axis, a connecting rod pivoted to each throw and a guided piston attached to the opposite end of each connecting rod; the attaching means between the piston and connecting rod comprising a link pivoted to the piston and to the connecting rod so disposed as to prevent substantial lateral movements of the pivotal connection between the link and rod, and cooperating means on the piston and connecting rod whereby the angular movements of the connecting rod impart differential longitudinal movements of the piston with respect to the connecting rod such that the oppositely moving masses of opposed pistons and connecting rods will substantially balance each other at all angular positions of the crank shaft.

2. The combination of a crank, a connecting rod having one end pivoted thereto, and a guided reciprocating member attached to the other end of said rod, the connection between the reciprocating member and the crank comprising a link pivoted to the reciprocating member and the rod in position to prevent substantial lateral movement of the rod at its connection with the link, and cooperating means on the reciprocating member and rod whereby the angular movements of the latter impart differential longitudinal movements to the reciprocating member with respect to the rod of such character as to substantially equalize the inertia forces due to the reciprocating masses in both half lengths of piston travel.

3. Means as defined in claim 2 wherein the link is pivoted to the reciprocating member at one side of that center plane thereof which is parallel with the crank axis.

4. Means as defined in claim 2, in which said link is pivoted to the reciprocating member at one side of that center plane thereof which is parallel with the crank axis and is disposed at approximately a right angle to the longitudinal axis of the member so that the movement of the upper end of the connecting rod is approximately parallel to said longitudinal axis.

5. The combination of a piston with a connecting rod, means whereby the oscillatory movement of the connecting rod imparts a differential axial movement to the piston and a link pivoted to the piston and the connecting rod, said link comprising pivot pin bearings connected by a slot, and a bolt for drawing together the parts separated by the slot.

6. A piston having a slipper type skirt and transverse members connecting the opposite slipper segments, a connecting rod, a wrist pin connected to the connecting rod between the ends of the latter, a guiding device on the piston for permitting longitudinal movement of the extremity of the connecting rod while restraining it from substantial lateral movement and connections between the wrist pin and said transverse members of such construction that change in angular position of the connecting rod produces differential longitudinal movements of the piston and connecting rod.

7. A piston having a slipper type skirt and transverse webs connecting the opposite slipper segments, eccentrics bearing in said webs, a wrist pin pivoted eccentrically in said eccentrics, a connecting rod attached to the wrist pin, the end of the connecting rod extending beyond the wrist pin, and a guiding device for permitting longitudinal movement of the connecting rod with respect to the piston while substantially preventing lateral movement thereof.

8. Means as defined in claim 5, in which the eccentrics are ring-like members provided with adjustable wrist pin bearings.

In testimony whereof I affix my signature.

ROGER KENNETH LEE.